UNITED STATES PATENT OFFICE.

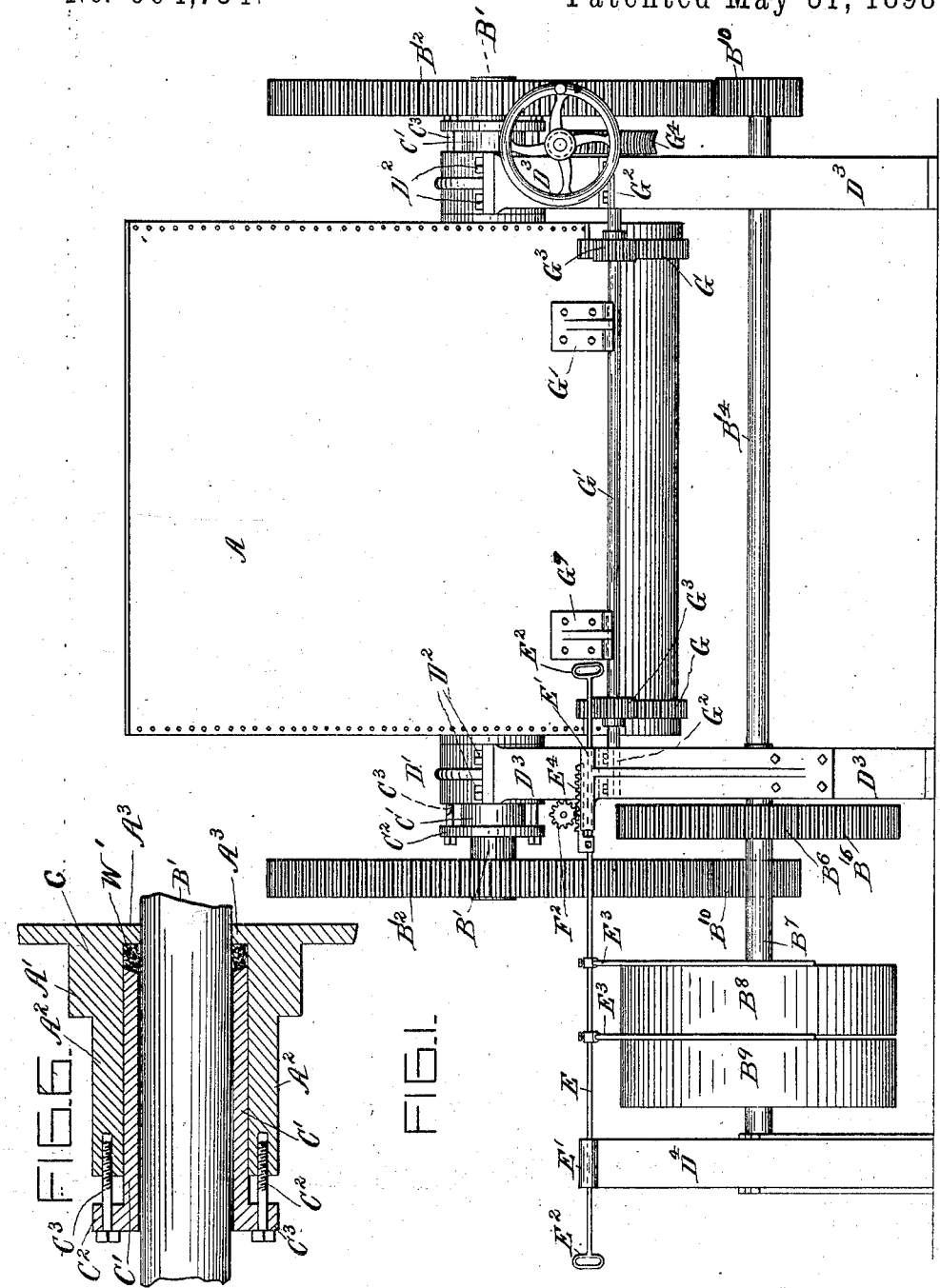

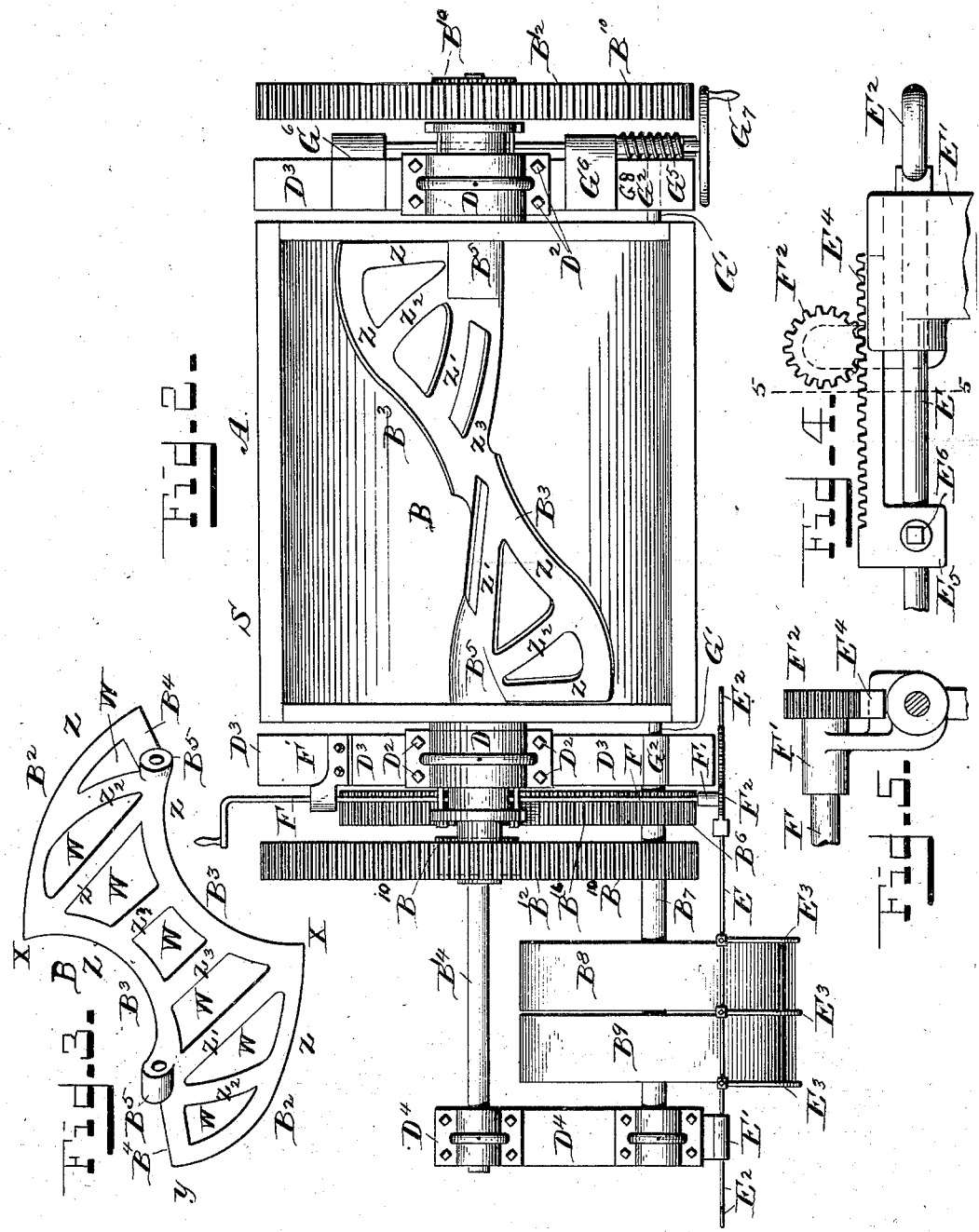

JOHN H. DAY, OF CINCINNATI, OHIO.

MIXING-MACHINE.

SPECIFICATION forming part of Letters Patent No. 604,734, dated May 31, 1898.

Application filed April 29, 1893. Serial No. 472,361. (Model.)

*To all whom it may concern:*

Be it known that I, JOHN H. DAY, a citizen of the United States, and a resident of Cincinnati, in the county of Hamilton and State of Ohio, have invented certain new and useful Improvements in Mixing-Machines, of which the following is a specification.

The several features of my invention and the various advantages resulting from their use, conjointly or otherwise, will be apparent from the following description and claim.

In the accompanying drawings, making a part of this specification, to which reference is hereby made, and in which like letters of reference indicate corresponding parts, Figure 1, Sheet 1, is a rear elevation of a mixing-machine illustrating the features of my invention. Fig. 2, Sheet 2, is a plan view of this machine, the top of the mixing-box being removed to show the agitator within. Fig. 3, Sheet 2, is another view, in perspective, of the agitator. Fig. 4, Sheet 2, is an enlarged side elevation of the pinion and rack of the belt-shifting device. Fig. 5, Sheet 2, is an elevation, partly in section, of the pinion and rack of the belt-shifting device, the section being taken at the dotted line 5 5 of Fig. 4 and that side of the section being shown which faces toward the pulleys. Fig. 6, Sheet 1, represents a vertical central section of one of the stuffing-boxes and its immediate connections, the shaft within being shown in elevation.

A indicates the mixer receptacle or hopper into which the substances to be mixed are thrown.

Inasmuch as one important use of the mixer is to mix into a dough the flour and the other ingredients necessary for the dough and also after that to knead the said dough, I will by way of illustration of my invention describe the operation of my mixer in connection with the making and kneading of dough, with the understanding that such description will sufficiently explain its operation in connection with other substances to be mixed for other products.

The hopper A is supported on end journals or trunnions A' A', respectively connected to the respective ends of the boxes and formed in one therewith. The upper portion of the hopper may be closed by a lid or door, but in the present illustrative instance is left uncovered. (See Fig. 2.) The agitator B within the hopper is supported on end journals B' B', which respectively pass through these trunnions A'. These trunnions are constructed to be the negative elements $A^2$ of a stuffing-box C, whose positive element C' passes within the trunnion and next to and around that agitator journal-shaft B' which passes through said trunnion. The element C' of the stuffing-box is approximated to the trunnion or moved back therefrom by means of the bolts $C^3$, passing through the rim $C^2$ of element C' and screwed into the trunnion. The packing W' is compressed within the trunnion and between the inner end of element C' and the bottom $A^3$ of the stuffing-box, said bottom consisting of the flange or extension extending from the inner end of the trunnion to the shaft B'.

The trunnions A' of the hopper A rest in bearings D, having caps D', secured in place over the trunnions by bolts $D^2$ to the lower half of their bearings in the usual manner. These bearings D are respectively supported by framework $D^3$, which latter also serves to support other portions of the mechanism hereinafter named. The hopper resting in and oscillating upon said trunnions A' A', can be tilted for the removing of the contents of the hopper, also for the purpose of cleaning the latter.

The agitator B within the hopper is of a novel and especially useful conformation, viz: The agitator is somewhat constricted at the middle and enlarged toward the ends. If the agitator were bent flat, as represented in Fig. 3, the ends $B^2$ $B^2$ thereof would be curved substantially as shown. So also each side edge $B^3$—viz., from the point $x$ of each end $B^2$ to the adjacent axial support $B^5$—is of a concave outline. From the axial support $B^5$ to the other point of the end $B^2$ the side edge is straight, constituting a side edge portion $B^4$. The planes of the sides of the agitator are curved somewhat (in general) after the manner of the blades of a propeller, and the agitator is of a twisted form from end to end, after the manner of a spiral. On account of such conformation the ends of the agitator, when its axis of revolution is horizontal, will be in planes perpendicular to and at right angles to the said axis of revolution. As the end walls of the hopper are at right angles to the axis of revolution of the said shaft, the plane in which the ends revolve will be parallel to the plane of the end walls, and consequently every part of the ends of the agitator can work in close proximity to the surface of that end wall of the hopper to which it is adjacent.

The two shafts B' B', which are distinct from the agitator and are respectively present at the respective ends of the agitator, are preferably made separate from the agitator itself for the following among other reasons: When made separate from the agitator, they (the shafts) may be of steel, and thus be much stronger than one of the same size of cast-iron, as aforesaid. The shaft being separable enables a broken agitator to be replaced by a new one. The agitator is suitably keyed to the shafts B' B'. The agitator as constructed upon my improved plan has remarkable strength, as well as lightness, and great effectiveness in operation.

The outer framework Z is connected and strengthened by a number of braces, as $Z'$ $Z^2$ $Z^3$, in duplicate, substantially as shown, between which are openings W, through which the materials to be mixed pass. These braces thus assist in the process of mixing and kneading the dough. The main brace $Z'$ of each side is an exceedingly useful one and confers that strength upon the agitator which it needs to withstand the strain to which it is necessarily subject.

The axial supports $B^5$ $B^5$ hold the agitator on the shaft or shafts. In the present illustrative instance these supports $B^5$ $B^5$ are sockets, the inner end or foot of one of the said shafts being received in one of the sockets, while the corresponding foot portion of the other shaft is likewise inserted and firmly fixed in the other socket. Each shaft B' carries its gear-wheel $B^{12}$. Each of these gear-wheels meshes with its respective operating-pinion $B^{10}$. These pinions $B^{10}$ $B^{10}$ are fixed on a common shaft $B^{14}$, journaled in suitable supports, as $D^3$ $D^3$ and $D^4$, and rotated by suitable power. In the present instance the assemblage of mechanism for this purpose is as follows: The shaft $B^{14}$ carries a large gear-wheel $B^{16}$, meshing into a pinion $B^6$, fixed on the shaft $B^7$. On the latter shaft is fixed the operating-pulley $B^8$ and its usual accompaniment—to wit, the idler-pulley $B^9$. Power communicated to pulley $B^8$ rotates shaft $B^7$, pinion $B^6$, and the latter rotates gear $B^{16}$, in turn rotating pinions $B^{10}$, which communicate motion to gears $B^{12}$, and the latter rotate, through the shafts B' B', the agitator B. In consequence of the intentional proportion of the diameters of the intercommunicating operating cog-wheels the rotation of the agitator is slow as compared with the rotation of the power-pulley $B^8$; but the rotation of the agitator is with great power.

Instead of sockets the axial supports $B^5$ $B^5$ may be cast solid with extensions serving for shafts B' B'. In other words, the agitator with a shaft at each end may be cast in one piece.

Desired changes in the speed of the agitator to accomplish the special character of work it has to perform can be obtained by well-known and customary changes in the proportionate sizes of the cog-wheels employed or by a change in the speed of the power-pulley $B^8$.

A combination of devices at once novel and effective for enabling the operator of the machine to shift the power-belt from the operative pulley $B^8$ to the idler-pulley $B^9$, or vice versa, from the various positions he commonly is to occupy in relation to the machine while attending to it during its operation is as follows: A rod E slides in bearings or guideways E' E', preferably attached to the respective supports $D^3$ $D^4$, as shown. Each end of the rod carries its handle $E^2$, whereby the rod may be slid back or forth. The rod E is the belt-shifting rod and carries the well-known belt-shifting fingers $E^3$ $E^3$, between which the belt runs and whereby it is compelled to shift from one of the pulleys $B^8$ $B^9$ to the other as the rod E is moved longitudinally. Near and to the left of that portion of the rod E which slides in the guideway E' on support $D^3$ is connected a rack $E^4$. One end of the latter is adjustably fixed on the rod E by means of a depending lug $E^5$, through which the rod passes, and a set-screw $E^6$ secures it in place. The main portion of the rack slides in a groove in the said adjacent guideway E'. A shaft F extends across the machine from rear to front and is journaled in the bearings F' F', respectively located on the front and rear portions of that support $D^3$ which supports one end of the belt-shifting rod E. The rear end of this rod carries a pinion $F^2$, meshing into the rack $E^4$. The other end of the rod F carries a handle whereby it (the rod) and the pinion $F^2$ are rotated and the rack $E^4$ reciprocated and the rod E moved and the belt shifted. This result could be accomplished by obvious modifications—to wit, by a portion of a gear-wheel or by a lever at the rear end of the rod F in connection with the belt-shifter. The principal advantages of this combination are as follows: The belt may readily be shifted and the rotation of the agitator started or stopped by the operator when standing in front of the hopper—viz., at S—or when standing at the right-hand end of the machine or when at the rear of the machine. Such arrangement gives the operator complete control of the operation of the agitator at all times.

There remains to be described a novel and most effective device for tilting the hopper on its journals or trunnions A', to wit: To the under or lower portion of the body of the hopper are attached a couple of racks G, the outline of whose face, viewed from the side, is in the arc of a circle described from the axis of the trunnions. One of these racks is near one end and the other near the other end of the hopper. $G'$ indicates a shaft properly supported in suitable journals—viz., at $G^2 G^2$ in framework $D^3 D^3$. Pinions $G^3 G^3$, fixed on shaft $G'$, respectively engage said racks. The shaft $G'$ is rotated by means of a worm-gear $G^4$, fixed thereon and meshing with a worm or screw $G^5$, carried on a concentric shaft $G^8$, journaled in bearings, as $G^6 G^6$, on the support $D^3$ and rotated by a crank or hand-wheel $G^7$ at the rear or front of the machine. Rotation of the worm $G^5$ thus causes the pinions $G^3$ to move the racks either forward or backward. By moving the racks backward the hopper A is tilted until its mouth is at the front instead of at the top. The hopper is now in a position where things can be introduced therein or taken therefrom, as desired. For example, the dough therein can be examined as to whether it is in condition to be withdrawn. The charge of dough can be taken out. A new charge of mixture to be made into dough can then be introduced. If the mixture be too soft to be introduced and kept in the hopper when the latter is so much on its side, a few turns of the worm $G^5$ will suffice to raise its mouth sufficiently high to retain such mixture. In returning the hopper to a vertical position it is prevented from passing beyond the latter and thus tilting forward by means of the stop-lugs $G^9 G^9$, fastened on the hopper and ingeniously arranged to utilize the shaft $G'$ as a stop, for as the hopper is righted and the racks G are moved backward the stop-lugs $G^9$ catch over and against the said shaft $G'$ and the hopper is brought to rest.

Obviously one rack and one pinion $G^3$ might be employed instead of two, so also one stop-lug $G^9$ instead of two. In such event the rack and pinion, and so also the stop-lug, if single, would preferably be located at the vertical median transverse plane of the hopper; but I prefer the twin arrangement shown, because the hopper is rendered more steady and its tilting is accomplished with less strain.

The advantages of the mechanism for shifting the belt from and at the front of the machine obtain additional emphasis from the fact that when the hopper has been tilted the operator watching the agitator and using the handle can turn the agitator as far as he desires, and when it has reached a given position he desires it to occupy, while removing the contents of the hopper and cleaning the agitator and a portion of the hopper, can stop it there. Thus he can at will place it consecutively in a series of positions he desires it to occupy for carrying into effect the aforenamed objects.

Those corners of the agitator which are respectively nearest the axial support $B^5$ are indicated by the letter Y.

What I claim as new and of my invention, and desire to secure by Letters Patent, is—

The combination of a hopper, an agitator therein, a power-pulley for operating the agitator and means intermediate between the agitator and power-pulley for enabling the latter to operate said agitator, the idler-pulley $B^9$ and sliding belt-shifting rod E, $E^3$, $E^3$, at the rear of the machine, and a movable rod F extending from the front to the rear of the machine, and there combined with means whereby a movement of rod F shall communicate a movement to the belt-shifting rod and cause the latter to shift the belt, substantially as and for the purposes specified.

JOHN H. DAY.

Attest:
W. F. MUCHMORE,
K. SMITH.